UNITED STATES PATENT OFFICE.

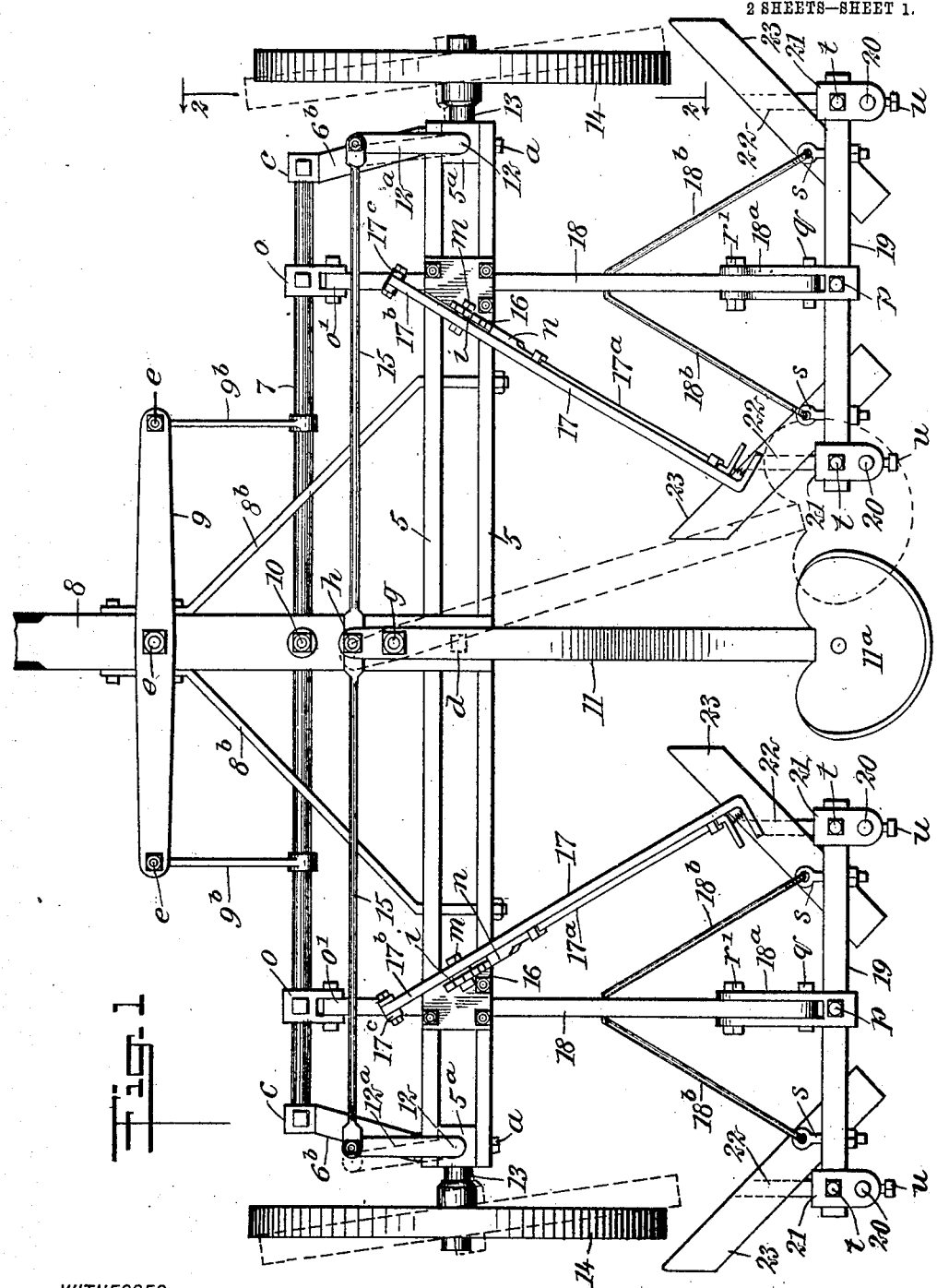

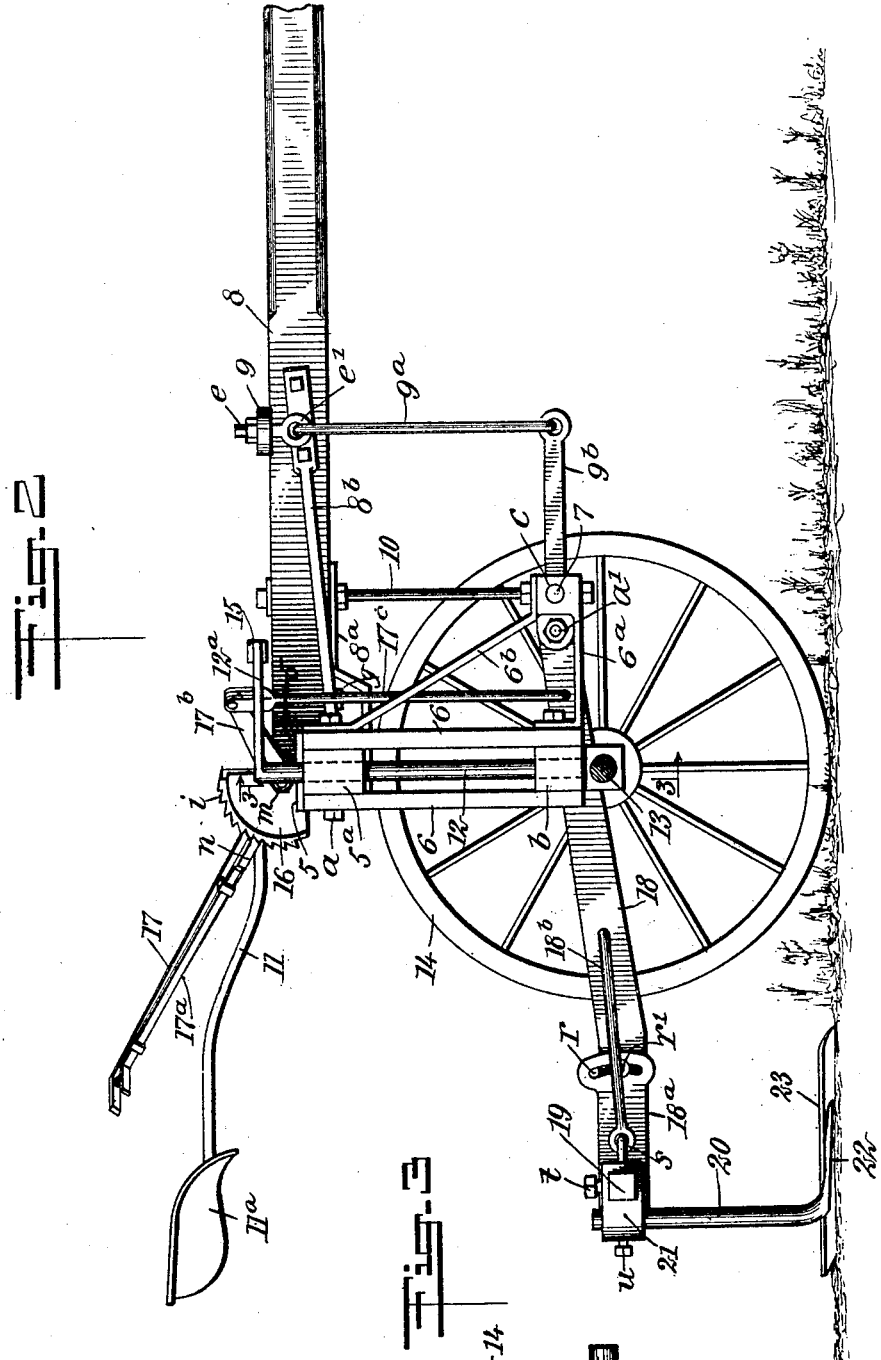

ELMER A. McREYNOLDS, OF STANFORD, ILLINOIS, ASSIGNOR OF ONE-FOURTH TO ALBERT C. GINGERICH, OF DANVERS, ILLINOIS.

COTTON-CHOPPING MACHINE.

No. 912,875.     Specification of Letters Patent.     Patented Feb. 16, 1909.

Application filed February 27, 1908. Serial No. 418,057.

*To all whom it may concern:*

Be it known that I, ELMER A. McREYNOLDS, a citizen of the United States, and a resident of Stanford, in the county of McLean and State of Illinois, have invented a new and Improved Cotton-Chopping Machine, of which the following is a full, clear, and exact description.

This invention relates to a class of implements employed for removing alternate equal portions of growing rows of cotton plants, to permit access to the blocks of plants left remaining, and promote their growth by subsequent cultivation around the plants.

The object of my invention is to provide novel details of construction for a cotton chopping machine, which enable the operator to perfectly control the depth of cut had by the chopping blades when in operation, permit the operator while seated upon the machine, by a movement of his body, to control the progressive or turning movement of the entire apparatus, and furthermore, to afford means for readily adjusting the frames that carry the cutter blades upon a transverse shaft, so as to dispose the pairs of said frames toward or from each other, for increasing their combined width of cut, or diminishing the same as may be desired.

The invention consists in the novel construction and combination of parts as is hereinafter described, and defined in the appended claims.

Reference is to be had to the accompanying drawings forming a part of this specification, in which similar characters of references indicate corresponding parts in all the views.

Figure 1 is a plan view of the machine; Fig. 2 is a transverse sectional view, substantially on the line 2—2 of Fig. 1; and Fig. 3 is a transverse sectional view, substantially on the line 3—3 of Fig. 2.

The main frame is in the form of two bars 5, 5 which are spaced apart in parallel planes, by two similar blocks $5^a$, $5^a$ that are secured between respective ends of said bars by any preferred means. A bracket frame is pendently hung from each end of the main frame bars 5, 5, each pendent frame comprising two similar bars 6, 6 that are lapped at their upper ends upon respective spacing blocks $5^a$, $5^a$ below the frame bars 5 and are thereon secured by a transverse bolt $a$, which passes through alined perforations in the pendent bars 6, frame bars 5, and spacing block $5^a$. The lower ends of each pair of the pendent frame bars 6, at each end of the main frame bars 5, are spaced apart by a filling block $b$, that is inserted and secured therebetween.

From the front face and at the lower end of each bracket frame, an arm $6^a$ is forwardly and horizontally extended, these similar arms at their forward ends, each carrying a bearing box $c$, and upon each of said boxes the lower end of a rearwardly and upwardly inclined brace $6^b$ is secured and thence is extended into contact with the front depending frame bar 6, at a respective end of a corresponding main frame bar 5, whereon it is secured by a transverse bolt $a'$.

In the bearing boxes $c$ a transverse main shaft 7 is secured at its ends, and is thus supported in a horizontal plane, and it will be obvious that the construction of the pair of bracket frames as described, affords a reliable support for the transverse shaft 7. Centrally on the main frame and between its bars 5, 5, the rear end of a draft pole 8 is secured by a clamping bolt $d$, the head of which appears in dotted lines in Fig. 1. On the lower surface of the frame bars 5 a clip plate $8^a$ is clamped at its rear end by the bolt $d$ and thence extends forwardly. A post 10 extends up from the shaft 7 and passes through the clip plate $8^a$ at its forward end, nuts on said post serving to clamp the forward end of said plate firmly upon the draft pole 8. A double tree 9 is pivoted at its center upon the pole 8, forward of the post 10, by a pivot bolt $e$. Upon the ends of the double tree 9, the upper ends of similar pendent links $9^a$ are shackled by eyes $e'$ of bolts $e$, loosely connected at their lower ends with the forward ends of similar arms $9^b$ that project forwardly from the shaft 7, thus transferring the draft strain on the double tree directly to the shaft 7. From the pole 8, near the double tree 9, two brace bars $8^b$ are divergingly extended rearward, their rear ends being secured upon the main frame bars 5, at an equal distance from the rear end of the draft pole 8, this construction serving to counteract side strain imposed upon the pole when the machine is turned sidewise.

Upon the rear portion of the draft pole 8, forward of and near the front frame member 5, a seat supporting bar 11 is pivoted near the forward end thereof by a bolt $g$, that extends down through the clip plate $8^a$ and is loosely secured thereto by a nut on the lower end of said bolt. The bar 11 is curved rearwardly and upwardly, and upon its elevated rear end a seat plate $11^a$ is mounted and secured. Two similar rock shafts 12 are details of the invention and are respectively positioned for service at opposite ends of the main frame bars 5, 5 as follows: Each rock shaft is preferably cylindrical in the body and of a diameter which will permit its insertion down through the spacing blocks $5^a$ and filling block $b$, at the upper and lower ends of the respective bracket frame of which said blocks are portions. Upon the lower edge of each rock shaft 12 that projects below a filling block $b$ the enlarged rear end of a stub axle 13 is secured, so that the main portion thereof, in the form of a spindle, projects horizontally outward from the rock shaft upon which it is secured.

On the spindles or stub axles 13 are respectively mounted two similar traction wheels 14, that are thus rotatably supported from the respective bracket frames, a sufficient distance outside of the same to permit the wheels to receive lateral turning movement together with the stub axles.

Upon the upper end of each rock shaft 12 an arm $12^a$ is formed or secured, these similar rock arms projecting forwardly in the same horizontal plane.

Two similar link-rods are respectively pivoted by one end of each, upon the outer end portion of a corresponding arm $12^a$, and thence each link rod trends toward the forward extremity of the seat supporting arm 11, whereon said extended end portions of the link rods are pivoted by a single pivot bolt $h$.

It will be noted that a person seated upon the seat plate $11^a$ may, by pushing with either foot upon the rear member of the main frame 5, 5, correspondingly swing the seat-bar 11 and, through the link rods 15, rock the rock-shafts 12 and laterally turn the traction-wheels 14, so as to incline them in the same direction, as indicated by dotted lines in Fig. 1.

Upon the spaced frame bars 5, 5 two similar sectors 16 are mounted and secured at points equally distant from the rear end of the pole 8, and upon each sector that is ratchet-toothed on its convexed edge, as shown at $i$, the lower end of a lever 17 is pivoted at the radial center of the periphery or toothed edge of a respective sector, as indicated at $m$ in Fig. 2.

On each lever 17, near the sector 16, upon which it is pivoted, a dog $n$ is slidably supported, that may be engaged between selected teeth $i$ on said sector, the dog being mounted upon or secured to the lower end of the presser bar $17^a$, which is slidably secured upon a respective lever 17, as is indicated for one lever in Fig. 2.

Two similar hanger frames for the support of chopping knives, are essential parts of the apparatus, and, as shown in Figs. 1 and 2 each knife bearing frame is constructed as follows: A straight arm 18 is loosely connected at one end with the main shaft 7 by a short link $o$, which latter is mounted at one end upon the shaft 7 and secured so that it may be changed in position upon said main shaft, the remaining end of the link $o$ being jointed as at $o'$ upon the forward end of a respective arm 18, as shown in Fig. 1. A preferably square bodied carrier bar 19, is movably secured upon the rear end of each arm 18, at right angles therewith, by means of a supplementary arm $18^a$, that is perforated laterally at its rear end, affording a rectangular opening wherein the carrier bar is inserted, a set screw $p$ serving to secure the supplementary arm in an appropriate position on the carrier bar upon which said carrier arm is mounted. Each supplementary arm $18^a$ is laterally held in engagement with the rear end portion of a respective main arm 18, by a pivot bolt $q$, that is passed through alined transverse perforations in the supplementary arm and adjacent end of the main arm. An arcuate slot $r$ is formed in the arm $18^a$ near the forward end thereof, said slot having its radial center in the axis of the pivot bolt $q$, and in each arcuate slot, a screw bolt $r'$ is inserted, which is screwed into a tapped perforation oppositely formed in an adjacent main arm 18.

It will be seen that by slackening the screw bolt $r'$, the arms 18, $18^a$ of each knife hanger frame, may be adjusted to produce an angle on their edges of more or less obtuseness as may be desired, the supplementary arm being rocked on the pivot bolt $q$, so that the clamping bolt $r'$ will traverse the arcuate slot $r$ a suitable degree, the bolt $r'$ then being tightened so as to hold the lapped arms 18, $18^a$, at a desired point of angular adjustment one upon the other. The main arm 18 for each knife carrying frame, is laterally stiffened by a pair of lateral braces $18^b$ which engage the arm 18 forwardly of the supplementary arm $18^a$ thereon, and diverge toward their rear ends, which are coupled by eye bolts $s$ upon the carrier bar 19 that is complementary to the main arm mentioned.

Upon each lever 17, at its lower end, a short limb $17^b$ is formed or secured, which projects forwardly therefrom and upon the free end portion of each limb $17^b$, the upper end of a lifting rod $17^c$ is loosely secured, the lower end of each lifting rod being similarly connected with a respective main arm 18, a short distance from the transverse shaft 7.

Each sector 16 is inclined laterally, so as to dispose its sides in a plane trending toward the seat plate 11ª, and also adapting the levers 17 to lean toward said seat when the machine is arranged for service, so as to be readily manipulated simultaneously, the operator on the seat using both hands.

On each carrier bar 19, at selected points, preferably near the ends of the same, a depending arm 20 is mounted and secured removably. The preferred means for mounting each depending arm 20 on the carrier bar it is complementary to, consists of a union box 21 which is slidably mounted on an appropriate end of the carrier bar 19 and is thereon secured by a set screw $t$, which is inserted in a tapped perforation in the box and bears upon the carrier bar as indicated for one union box in Fig. 2. Each box 21, at its rear end, is vertically perforated and receives therein the upper end of a corresponding arm 20, which arm is secured in the box by a set screw $u$ that is screwed through a tapped perforation in the side of the union box and has forcible contact laterally upon the upper end of the arm 20. Upon the lower end of each depending arm 20, a forwardly projecting member 22 is formed or secured, said member being flattened on the upper side thereof, and thus adapted for reception of a plate-like flat cutter blade 23, which is firmly secured upon the upper surface of a respective member 22 and disposed at an appropriate angle with relation to the complementary blade on the other depending arm, and also to the vertical planes defined by the sides of a corresponding main arm 18.

It will be apparent that the forward edges of each of the cutting knives or blades 23, which are sharpened, may be inclined downward for entering the soil, as shown for one blade in Fig. 2, by an angular adjustment of a supplementary arm 18ª on the rear end of the main arm 18 upon which it is adjustably mounted.

Assuming that the complete implement is arranged in its parts for chopping out cotton plants at even intervals, so as to let the blocks remain, and that by connection of a team of draft animals to the draft pole 8, the details of the machine will be disposed so that the cutter blades 23 will enter the soil and engage with the roots of the plants that are to be removed; the operator seated in the seat 11ª now can with both hands, grasp the respective levers 17 and by rocking said levers, raise or lower the cutter blades 23, while the machine is in progressive motion; furthermore, the engagement of the dogs carried by the levers 17 and their engagement with the teeth of the sectors 16, permits the levers to be inclined more or less for a corresponding elevation of the cutter blade frames as the condition of the work done by the blades requires.

As before mentioned, the occupant of the seat 11ª can, by foot pressure at either side of the seat bar 11, swing said seat bar laterally and simultaneously turn the rock shafts 12, stub axles and traction wheels, so as to properly incline the latter and change the direction of progressive movement had by the machine, toward either side, as may be desired.

If desired, the arms 18 may be changed in position on the main shaft 7, so as to give the knife carrying frames corresponding adjustments toward or from each other.

The depending arms 20 of each carrying frame, may be raised or lowered on the transverse bar they are mounted upon, and also rotatably adjusted more or less, so as to change the degree of divergence of the points of the pairs of the cutter blades 23 toward or from each other, and thus contract or widen the extent of cutting action had by said blades.

It will also be apparent that by depression of the normally upper ends of the levers 17, the knife carrying frames may be raised from the ground, and held in such a position by an engagement of the dogs on said levers with the sectors 16, this being very essential during the operation of the machine and also when it is being transferred from or to the cotton field.

Having thus described my invention, I claim as new and desire to secure by Letters Patent:

1. A cotton chopper, embodying a main frame formed of two spaced parallel bars, two similar bracket frames depending from the ends of the main frame, each bracket frame having a forward extension thereon, a main shaft mounted at its ends on said forward extensions, two knife carrying frames rockably supported by their forward ends on the main shaft and spaced thereon, a toothed sector on the main frame above a respective carrying frame, a lever pivoted on each sector, an adjustable dog on each lever and meshing with the teeth on a respective sector, each lever having a laterally extended arm on its lower end, and a lifting rod connecting each carrying frame with a corresponding arm on each lever.

2. A cotton chopper of the character described, embodying a plurality of knife carrying frames, each of said frames comprising an elongated arm, a supplementary arm pivoted on the rear end of the elongated arm, the supplementary arm having an arcuate slot in its forward end, a set screw passed through said slot and engaging the end of the elongated arm whereon the supplementary arm is lapped and pivoted, a transverse carrier bar mounted on the rear portion of the supplementary arm, a union box adjustably secured on each end of the carrier bar, a depending arm carried adjustably on the union box, and a cutter blade secured flatwise on a flat angular extension formed on the lower end of the depending arm.

3. In a cotton chopper, a frame, an arm pivotally connected at its forward end to the frame, a carrier bar adjustably secured to the rear end of the arm, boxes adjustably mounted upon the carrier bar, and cutter blades having their shanks adjustably secured in said boxes.

4. In a cotton chopper, a frame, an arm pivotally connected at its forward end to the frame, a supplemental arm adjustably pivoted to the rear end of the first named arm, a carrier bar adjustably secured to the supplemental bar, and cutter blades mounted on the carrier bar, and cutter blades having their shanks secured in said boxes.

5. In a cotton chopper, a frame provided with forwardly projecting members, a shaft mounted in the said members, arms pivotally connected at their forward ends to the shaft, cutter blades carried by the rear ends of the arms, operating levers having forwardly projecting members at their lower ends, and rods secured to the said members and to the cutter carrying arms.

In testimony whereof I have signed my name to this specification in the presence of two subscribing witnesses.

ELMER A. McREYNOLDS.

Witnesses:
  C. F. SHNIKLE,
  F. Y. HAMILTON.